United States Patent [19]

Lee et al.

[11] 3,916,110

[45] Oct. 28, 1975

[54] LINE CIRCUIT EMPLOYING CONSTANT CURRENT DEVICES FOR BATTERY FEED

[75] Inventors: David Q. Lee, Chicago; Dinesh K. Srivastava, Westmont, both of Ill.

[73] Assignee: GTE Automatic Electric Laboratories Incorporated, Northlake, Ill.

[22] Filed: May 2, 1974

[21] Appl. No.: 466,428

[52] U.S. Cl. .............................. 179/16 F; 323/22 T

[51] Int. Cl. .......................... H04m 1/76; G05f 1/64

[58] Field of Search ................ 179/16 F, 18 F, 81 R, 175.3 R; 323/22 T, 15; 307/15, 31; 321/18

[56] References Cited

UNITED STATES PATENTS

| | | | |
|---|---|---|---|
| 3,035,122 | 5/1962 | Livingstone | 179/16 F |
| 3,549,983 | 12/1970 | Sprogis | 323/15 |
| 3,581,104 | 5/1971 | Thew | 323/22 T |
| 3,743,917 | 7/1973 | Zettl et al. | 179/16 F |

*Primary Examiner*—Thomas A. Robinson
*Attorney, Agent, or Firm*—Robert J. Black

[57] ABSTRACT

An improved line circuit using two constant current devices, one of which is independently set to a desired DC current value, while the other is controlled so as to have its constant value the same as the independent source. In principle, the independent current source acts as a master source, while the dependent current source, under feedback control, acts as a slave DC current sink.

9 Claims, 1 Drawing Figure

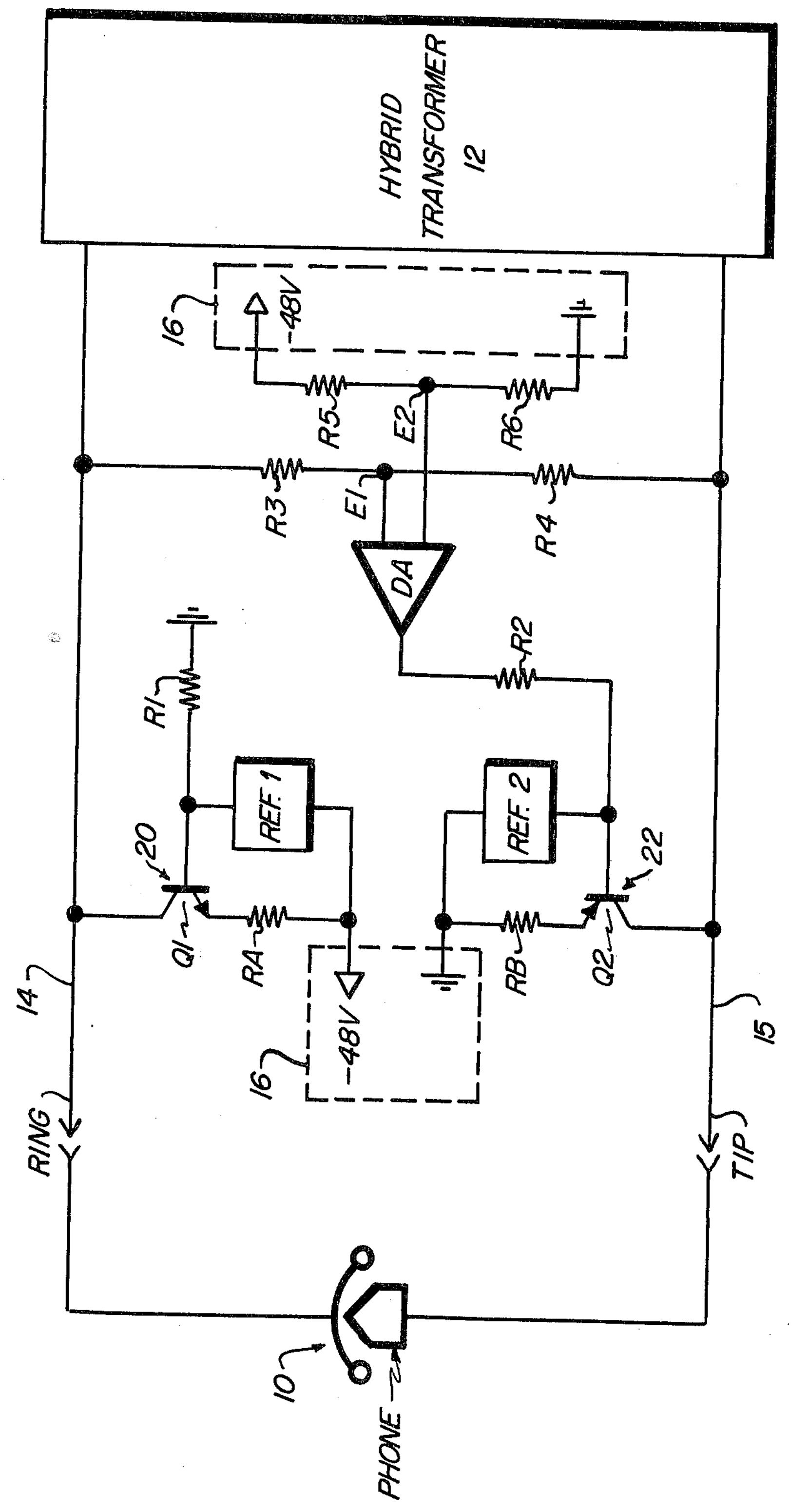
HYBRID TRANSFORMER 12
16
-48V
R5
E2
R6
R3
E1
R4
DA
R2
R1
REF. 1
REF. 2
20
22
Q1
RA
RB
Q2
14
15
-48V
16
RING
TIP
10
PHONE

LINE CIRCUIT EMPLOYING CONSTANT CURRENT DEVICES FOR BATTERY FEED

This invention relates to telephone line circuits and, more particularly, to line circuits for feeding line current from the telephone exchange over a loop telephone line to the subscriber subset.

As it is generally well-known, subscriber subsets are normally connected to the central office or telephone exchange by means of two metallic conductors arranged to form a subscriber's loop. Such loops often vary greatly in length and other characteristics resulting in different loop impedances as seen from the central office. As a result, difficult problems related to the signal attenuation are experienced with the high impedance loops.

Various different arrangements and methods have been proposed to overcome these problems. For example, conventional means of battery feed include an inductive battery feed method with a large inductance in series in the subscriber loop and separate from the hybrid transformer, or with the inductance of the transformer in series with the subscriber loop. Current limiting is often provided by series resistors or varistors. The inductors offer high impedance to AC signals, hence a high degree of isolation exists between the battery source and the transmission loop.

With either inductive battery feed method, large inductance values are required to achieve high AC impedance and to minimize transmission loss. Further, the AC impedance of the inductors is frequency dependent, causing non-uniform loading across the audio frequency. Accordingly, the inductors must offer sufficient AC impedance at the lowest frequency of interest. Also, since the DC current must flow through the inductors, large core or iron size is required to prevent saturation which results in reduced AS inductance. This results in a large inductance device. Further, to achieve good longitudinal balance, the inductance inserted from one side of the battery to the tip conductor must be equal to the inductance inserted from the other side of the battery to the ring conductor.

If an electronic circuit such as a constant current device in its active mode could be substituted for the battery feed inductors, then a high AC impedance uniform across the audio frequencies could be achieved. If two such devices were employed under appropriate control, a high degree of longitudinal balance could be achieved. Since the AC impedance offered by such a method is not dependent on the amount of DC current flow, size is of no major consideration In U.S. Pat. No. 3,522,384, an arrangement exemplary of the above first-mentioned electronic circuit is disclosed. In the illustrated arrangement, improved central office telephone equipment of the type employing common battery signaling and common battery talking is provided through the inclusion of constant current regulators in the normal connector circuits between the battery and the transmission relay feed coils. This permits the battery potential to be elevated, if desired, without danger to equipment or interference with short loop performance, and further allows more optimum transmission of voice frequency information and signaling on all loops without requiring special circuitry or dedicated boosters.

Similarly, in U.S. Pat. No. 3,035,122, there is disclosed a constant current line circuit for loop telephone lines comprising transistors connected in series with balancing resistors and a battery. A reference potential is applied to each of two transistors used, so that each is independently controlled.

In the case of the arrangements of both of these prior patents, neither discloses or contemplates using two constant current devices to provide a high degree of longitudinal balance.

In accordance with the present invention, two constant current devices are used, one of which is independently set to a desired DC current value, while the other is controlled so as to have its constant value the same as the independent source. Accordingly, in principle, the independent current source acts as a master source, while the dependent current source, under feedback control, acts as a slave DC current sink. Since the current flowing through the master source and the slave sink are equal, and they share the same DC loop as the common load, transmissionwise, a balanced high impedance battery feed to the subscriber loop results.

Accordingly, it is an object of the present invention to provide improved line circuits for feeding line current from the telephone exchange over a loop telephone line to the subscriber subset.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

The single FIGURE is a schematic diagram of the invention.

Referring now to the drawing, a subscriber's subset 10 is illustrated coupled to a hybrid transformer 12 in a telephone exchange via a pair of metallic conductors 14 and 15 which are commonly known as the ring and tip leads, respectively, and which form part of the subscriber's loop. It will be appreciated that the subscriber's loop, as illustrated, is greatly simplified for the sake of clarity in explaining the invention. As discussed above, the length of the subscriber's loop from the telephone exchange to the subscriber's subset can vary from station to station. So-called talking battery or line current for the subscriber's subset is provided by an office battery 16 which is coupled to the ring and tip leans 14 and 15, in the well-known manner.

In accordance with the invention, a pair of constant current sources 20 and 22 are located in the telephone exchange, and are coupled to the ring and tip leads 14 and 15 respectively. The constant current sources 20 and 22 consist of transistors Q1 and Q2, respectively, which are connected in series with a common loop load of the subscriber's loop.

More particularly, the transistor Q1 of the constant current source 20 is connected between the negative terminal of the office battery 16 and the ring lead 14. The constant current source 20 is an independent or master current source whose magnitude is arbitrarily fixed by the selection of the resistors R1 and RA and the circuit REF. 1 which can be any combination of resistors, diodes or Zener diodes. The transistor Q2 of the constant current source 22 is connected between the ground positive terminal of the office battery 16 and the tip lead 15. This constant current source 22 is a dependent or slave current source whose magnitude is continuously varied by electronic feedback control to be always equal to the magnitude fixed by the transistor Q1.

Feedback control of the constant current source 22 is provided by a differential amplifier DA whose output is coupled through a resistor R2 to the base electrode of the transistor Q2. A pair of resistors R5 and R6 coupled between the terminals of the office battery 16 set a reference potential E2 midway between ground and battery, and this reference potential E2 is connected as one input to the differential amplifier DA. The other input to the differential amplifier DA is provided by the resistors R3 and R4 coupled across the ring and tip leads 14 and 15. These resistors R3 and R4 set a reference potential E1 midway between the potential existing on these ring and tip leads 14 and 15.

The differential amplifier DA sets the magnitude of the constant current source 22, under control of the resisitors RB and R2 and the circuit REF. 2 which can be any combination of resistors, diodes or Zener diodes. The condition of balance required E1=E2, and that the current flow through the transistor Q2 to be arbitrarily slaved to that put out by the transistor Q1. The transistor Q2, therefore, adjusts to the current of transistor Q1 and remains a constant current source.

Also, since the differential amplifier DA is referenced by the potential E2 which is a variable dependent on the office battery potential, and the same office battery is used to derive the two constant current sources, fluctuations in the office battery voltage are cancelled out. Common-mode signals appearing at the ring and tip leads 14 and 15 are cancelled out due to the requirements of balanced conditions, that is, E1=E2. However, differential signals do not effect E1 and hence are transmitted unattenuated.

This arrangement provides numerous advantages including the fact that the battery feed device can be of very small size and of low cost, since no inductors are required. Also, the impedance across the subscriber's loop is very high, thus smaller losses result. A comparable inductive feed device would have to be of a prohibitively large size. Further, since the impedance is independent of the frequency, it results in a uniform response across the audio frequencies. An inductive device, on the other hand, due to non-uniform response, would require frequency compensation.

A high degree of longitudinal balance is achieved across the ring and tip leads at all frequencies, since both of the constant current sources adjust to the same constant current magnitude. Also, since the subscriber's loop has a constant current flowing through it, any in-phase voltages tending to unbalance the current sources are cancelled out. Any voltage fluctuations in the office battery voltage also are absorbed by the constant current sources 20 and 22, hence an office battery with greater voltage tolerances and high noise can be used.

Series voltage dropping resistors for shorter loops, and strapping in and out of a combination of such resistors for different lengths of subscriber loops is not required. The constant current sources 20 and 22 automatically adjust the voltage drops across themselves so as to maintain the desired current flowing through different loop lengths. The office battery, furthermore, is protected against short circuits due to current limitation.

Subscriber loop lengths can be monitored as a function of the voltage drops across the constant current sources. The sources can be automatically turned off, or made to signal a remote device if the loop length is outside of specified limits. On-hook, off-hook and dialing can be detected by the change in the controlling voltage for the dependent source 22.

Also, from the description, it will be apparent that the roles of the master current source and the slave current source can be interchanged, with the master current source being operated from the ground side and the slave current source being operated from the battery side.

It will thus be seen that the objects set forth above, among those made apparent from the preceding description, are efficiently attained and certain changes may be made in the above construction. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A constant current line circuit for a two conductor loop telephone line whose impedance may vary with length comprising a source of direct current, a first constant current device whose magnitude is fixed connecting one terminal of said source to one conductor of said line, a second constant current device whose magnitude is continuously varied connecting the other terminal of said source to the other conductor of said line, and means for continuously varying the magnitude of said second constant current source to be always equal to the magnitude of said first constant current source, whereby a balanced high impedance battery feed to said line is provided.

2. The constant current line circuit of claim 1, wherein said source of direct current comprises a battery.

3. The constant current line circuit of claim 2, wherein said means for continuously varying the magnitude of said second constant current source comprises a differential amplifier.

4. The constant current line circuit of claim 3, further including means coupled across said two conductors of said line and establishing a first reference potential, and means coupled across the terminals of said source and establishing a second reference potential, said first and second reference potential being coupled to said differential amplifier to operate it and the output thereof being coupled to said second constant current source to continuously vary its magnitude.

5. The constant current line circuit of claim 4, wherein said means coupled across said two conductors of said line comprises resistance means for establishing said first reference potential midway between the potential existing on said two conductors, and wherein said means coupled across the terminals of said source comprises resistance means for establishing said second reference potential midway between ground and battery potential.

6. The constant current line circuit of claim 5, wherein said differential amplifier is referenced by said second reference potential, thereby canceling out fluctuations in battery voltage.

7. The constant current line circuit of claim 6, wherein said first reference potential equals said second reference potential for conditions of balance.

8. The constant current line circuit of claim 3, wherein said first constant current source comprises a transistor having its collector-emitter circuit connecting one terminal of said source to one conductor of said line, and wherein said second constant current source comprises a transistor having its collector-emitter circuit connecting the other terminal of said source of the other conductor of said line.

9. The constant current line circuit of claim 8, further including means for establishing the magnitude of said first constant current source of an arbitrarily fixed magnitude, and means for establishing the magnitude of said second constant current source, said differential amplifier setting the magnitude of said second current source under control of said latter means.

* * * * *